(12) United States Patent
Sheets

(10) Patent No.: US 10,644,434 B2
(45) Date of Patent: May 5, 2020

(54) CONNECTOR, INGRESS PROTECTION ASSEMBLY FOR A CONNECTOR AND METHOD FOR PRODUCING A CONNECTOR

(71) Applicant: Turck Inc., Plymouth, MN (US)

(72) Inventor: Alexander Rudolph Sheets, Minneapolis, MN (US)

(73) Assignee: TURCK INC., Plymouth, MN (US)

( * ) Notice: Subject to any disclaimer, the term of this patent is extended or adjusted under 35 U.S.C. 154(b) by 0 days.

(21) Appl. No.: 16/040,638

(22) Filed: Jul. 20, 2018

(65) Prior Publication Data

US 2020/0028297 A1 Jan. 23, 2020

(51) Int. Cl.
| | |
|---|---|
| *H01R 13/504* | (2006.01) |
| *H01R 13/52* | (2006.01) |
| *H01R 13/6593* | (2011.01) |
| *H01R 13/62* | (2006.01) |
| *H01R 43/00* | (2006.01) |
| *H02G 3/08* | (2006.01) |

(52) U.S. Cl.
CPC ....... *H01R 13/5202* (2013.01); *H01R 13/504* (2013.01); *H01R 13/62* (2013.01); *H01R 13/6593* (2013.01); *H01R 43/005* (2013.01); *H01R 13/5216* (2013.01); *H02G 3/088* (2013.01)

(58) Field of Classification Search
CPC ............ H01R 13/5221; H01R 13/5205; H01R 13/5208; H01R 13/562; H01R 13/5202; H01R 13/504; H01R 13/6593; H01R 13/62; H01R 13/5216; H01R 43/005; H02G 15/04; H02G 15/013; H02G 3/088

USPC ............... 439/274, 275, 279, 447, 587, 588; 174/74 R, 77 R
See application file for complete search history.

(56) References Cited

U.S. PATENT DOCUMENTS

| | | | | |
|---|---|---|---|---|
| 3,152,472 | A * | 10/1964 | Munn | G01R 27/18 174/11 R |
| 6,273,754 | B1 * | 8/2001 | Bunch | H01R 13/405 439/587 |
| 7,766,690 | B2 * | 8/2010 | Walker | H01R 13/432 439/447 |
| 7,942,696 | B2 * | 5/2011 | Watson | E21B 17/023 439/589 |

(Continued)

FOREIGN PATENT DOCUMENTS

EP 0865109 A2 9/1998

*Primary Examiner* — Gary F Paumen
(74) *Attorney, Agent, or Firm* — Leydig, Voit & Mayer, Ltd.

(57) ABSTRACT

A connector comprises an enclosure configured to receive at least one electrical conductor within the enclosure, a sealing ring surrounding the enclosure in tight mechanical contact, a compression ring surrounding the sealing ring in tight mechanical contact and being adapted to press the sealing ring against the enclosure, and an over-mold element arranged to surround at least a part of the compression ring and at least a part of the enclosure and configured to form a fusion bond with the compression ring. The sealing ring is configured to form a mechanical seal between the enclosure and the compression ring, and the compression ring and the over-mold element are configured to form a fusion bond seal between themselves.

13 Claims, 7 Drawing Sheets

(56) References Cited

U.S. PATENT DOCUMENTS

| | | | | |
|---|---|---|---|---|
| 7,976,341 B2* | 7/2011 | Osenberg | ............... | H01R 9/032 |
| | | | | 439/607.41 |
| 8,092,260 B2* | 1/2012 | Sjostedt | ................ | H01R 13/59 |
| | | | | 439/587 |
| 8,113,889 B2* | 2/2012 | Zhang | .................... | H01R 43/24 |
| | | | | 439/606 |
| 2004/0038588 A1* | 2/2004 | Bernardi | ............. | G02B 6/3879 |
| | | | | 439/587 |
| 2010/0167582 A1* | 7/2010 | Watson | ................ | E21B 17/023 |
| | | | | 439/589 |
| 2014/0273579 A1* | 9/2014 | Madden | ............. | H01R 13/5205 |
| | | | | 439/275 |
| 2015/0157797 A1* | 6/2015 | Eggert | .................... | A61M 5/19 |
| | | | | 604/506 |
| 2015/0338584 A1* | 11/2015 | Islam | ................... | G02B 6/3849 |
| | | | | 385/86 |
| 2015/0352306 A1* | 12/2015 | Scheiner | ............... | A61M 16/06 |
| | | | | 128/205.25 |
| 2016/0020549 A1* | 1/2016 | Chen | ................. | H01R 13/5219 |
| | | | | 439/78 |
| 2016/0296720 A1* | 10/2016 | Henry | ............... | A61M 16/0666 |
| 2018/0117313 A1* | 5/2018 | Schmidt | ............... | A61N 1/0556 |

\* cited by examiner

US 10,644,434 B2

CONNECTOR, INGRESS PROTECTION ASSEMBLY FOR A CONNECTOR AND METHOD FOR PRODUCING A CONNECTOR

FIELD

The invention generally relates to an ingress protection sealing of connectors, in particular connectors providing a full or partial non-bondable enclosure for industrial automation or mobile equipment products. The invention relates in particular to connectors having an ingress protection for reducing or eliminating an intrusion of foreign bodies and/or fluids, in particular of dust and/or moisture.

BACKGROUND

In the prior art, connectors for industrial automation or mobile equipment products are known having a full or partial non-bondable enclosure for receiving one or more electrical conductors to be connected by means of such connectors. The enclosure often serves the purpose of protecting the electrical conductor(s) within the connector from electromagnetic interference and/or physical damage. For protecting the connector and/or the electrical conductor from environmental influences and/or from the intrusion of foreign bodies and/or fluids, in particular from the intrusion of dust and/or moisture, an outside over-molded thermoplastic shell is typically provided. Such a thermoplastic shell can typically not be directly attached to the enclosure, because the enclosures are often made of materials not allowing a bonding with the over-molded thermoplastic shell. Thus, further means are required for hindering the ingress of foreign bodies and/or fluids between the over-molded shell and the enclosure.

Typically, a sealing between the enclosure and the over-mold shell is achieved by producing the connector in a two-step over-mold process, wherein in a first molding step the enclosure is sealed with a glue-like hot melt and in a second step a thermoplastic molding is added to achieve mechanical and chemical protection and also a robust appearance and good haptic properties. A production method for a shielded connector is disclosed, for example, in U.S. Pat. No. 7,976,341 B2. Such an assembly typically allows an ingress protection up to a protection class of IP67.

However, such production methods are challenging due to the use of hot melt adhesives for sealing the enclosure by encapsulation, the success of which is often highly dependent on the molding process parameters making it difficult to achieve the necessary level of control of essential production parameters. In particular when encapsulating assemblies varying in their volume and/or geometry, such as a varying number of electrical conductors in the connector, careful adjustments of manufacturing parameters may be required. Moreover, additional process steps are required, like two-step molding or compression fitting between the components, to achieve proper sealing of the connector, which increase the effort and costs for producing the connectors.

Conventional production methods for shielded connectors often are based on adding adhesives. This labor intensive procedure often leads to varying results due to changing environmental conditions during the production, such as temperature, pressure, humidity etc.

Other conventional methods are based on providing grooves for increased path length of water ingress. Such methods require expensive, custom machined parts. Furthermore, such methods require a distinct orientation of the involved parts during their assembly and the resulting connector is typically bigger than functionally necessary.

Yet other conventional methods involving a two-step molding require two distinct sets of tooling, such as two different kinds of molding machinery, which results in high financial expenses. Moreover, the success of such production methods is typically highly dependent on the careful control of molding parameters within a small range.

Other conventional methods are based on a single compression fit between the components of the connector, which also requires expensive customized components made in tight tolerances. In addition, the assembly often requires special tooling rendering the production method and, thus, the produced connectors expensive.

SUMMARY

In an embodiment, the present invention provides a connector comprising an enclosure configured to receive at least one electrical conductor within the enclosure, a sealing ring surrounding the enclosure in tight mechanical contact, and a compression ring surrounding the sealing ring in tight mechanical contact and being adapted to press the sealing ring against the enclosure. Furthermore, the connector comprises an over-mold element arranged to surround at least a part of the compression ring and at least a part of the enclosure and configured to form a fusion bond with the compression ring. The sealing ring is configured to form a mechanical seal between the enclosure and the compression ring. In addition, the compression ring and the over-mold element are configured to form a fusion bond seal between themselves.

DETAILED DESCRIPTION OF THE INVENTION

Figure 1:
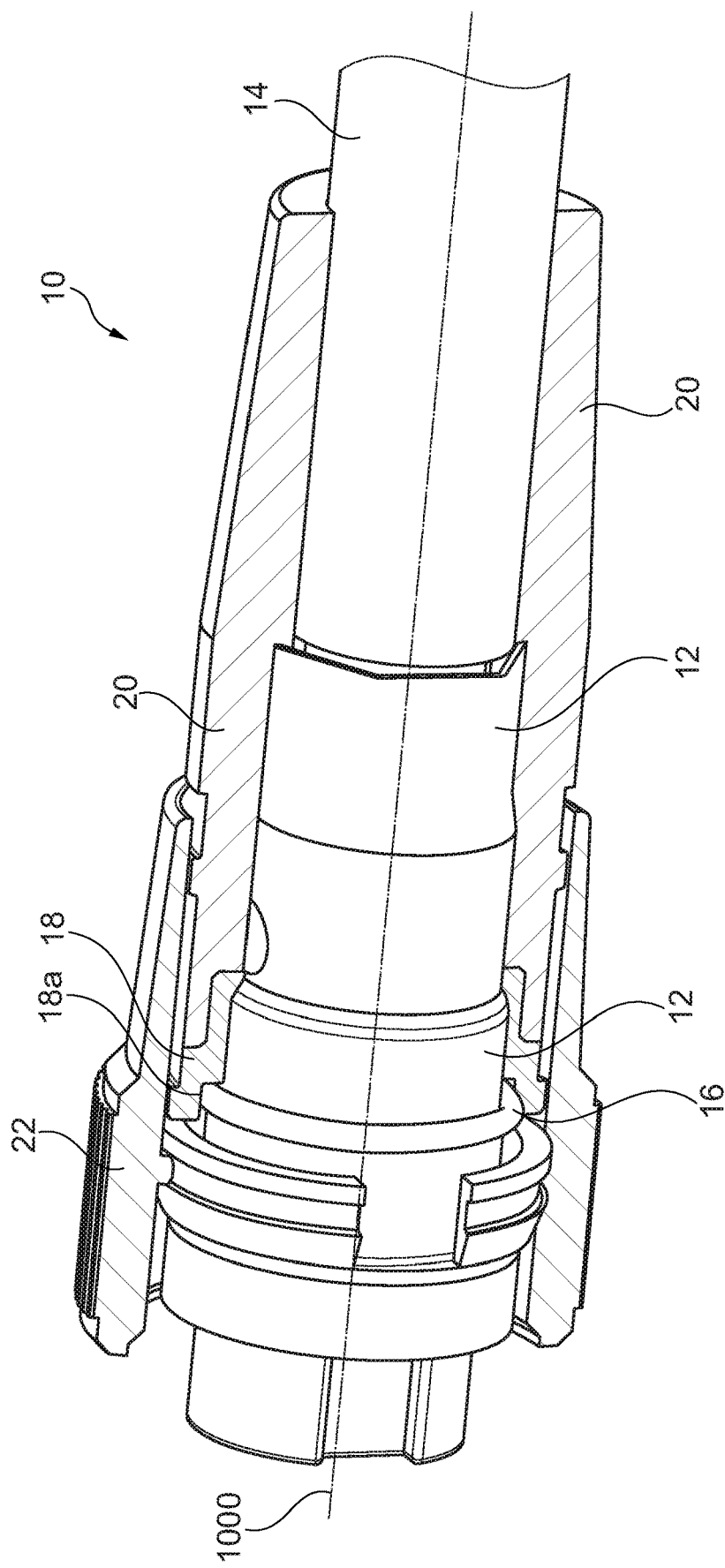
FIG. 1 depicts, in a perspective view, a connector according to an embodiment of the invention.

Embodiments of the invention provide ingress protection assemblies and methods for producing a connector. According to an embodiment, the invention provides an ingress protection assembly for a connector having an enclosure for receiving at least one electrical conductor and an over-mold element surrounding at least a part of the enclosure. The ingress protection assembly comprises a sealing ring configured to surround the enclosure in tight mechanical contact and a compression ring configured to surround the sealing ring in tight mechanical contact and being adapted to press the sealing ring against the enclosure and to form a fusion bond with the over-mold when molded onto the compression ring. The sealing ring is adapted and configured to form a mechanical seal between the enclosure and the compression ring, and the compression ring and the over-mold element are adapted and configured to form a fusion bond seal between each other.

According to another embodiment, the invention provides a method for producing a connector. The method includes providing an enclosure receiving at least one electrical conductor within the enclosure, arranging a sealing ring such as to surround the enclosure in tight mechanical contact and arranging a compression ring such as to surround the sealing ring in tight mechanical contact and to press the sealing ring against the enclosure such that the sealing ring forms a mechanical seal between the enclosure and the compression ring. The method further includes molding an over-mold element onto the enclosure such as to surround at least a part of the compression ring and at least a part of the enclosure and to form a fusion bond seal between the over-mold element and the compression ring.

The enclosure may be at least partly rigid, such that at least a part of the enclosure is mechanically rigid and/or non-compressible. In particular the part of the enclosure at which the sealing ring and the compression ring are arranged may be rigid and/or stiff enough to sustain the pressure and/or force applied by the sealing ring and the compression ring and optionally by the over-mold element. Optionally, the enclosure may be stiff and/or rigid enough to sustain possible higher pressures and/or forces, which may be applied during the production of the connector, or to be expected during the use of the connector.

A tight mechanical contact between the sealing ring and the enclosure means that there is no space or gap between the enclosure, in particular an outer surface of the enclosure, and the sealing ring.

The over-mold element is arranged to surround at least a part of the compression ring and at least a part of the enclosure which means that the over-mold element may be configured to fully or partly surround the compression ring and/or the enclosure. Furthermore, the over-mold element may be configured to cover the compression ring and/or the enclosure over their full length (for instance along the connector axis), respectively, or only a part of their lengths.

Forming a mechanical seal means that a tight connection is established by mechanical forces, such that no foreign objects and/or fluids may penetrate the seal. A mechanical seal preferably establishes a tight seal without the need of further sealing means, such as adhesives, or fusion.

A fusion bond seal establishes a tight seal by fusing the two respective elements together to merge these two elements in manner that the connection is impermeable for foreign objects and/or fluids. In particular, establishing a fusion bonding may involve melting one or both of the elements to bond with each other.

Embodiments of the invention allow achieving a tight seal between the enclosure and the over-mold element, even if a fusion bond between the enclosure and the over-mold element is not possible. In particular, embodiments of the invention allow providing the enclosure made of materials, which may not be suitable for fusion bonding with the over-mold element. For instance, the enclosure may be made of or comprise a metal and/or a low-surface energy plastic material and/or a thermoset plastic material and/or a ceramic material, which may not be suitable for fusion bonding with the over-mold element. For instance, the enclosure may be made of a material having a poor meltability and/or not being meltable. Alternatively or additionally, the enclosure may be made of a material having a significantly higher melting temperature than the over-mold element and, thus, not allow an efficient fusion bond between the enclosure and the over-mold element. However, due to ingress protection assemblies according to embodiments of the invention, a mechanical seal between the compression ring and the enclosure can be achieved by providing the sealing ring therebetween and a fusion bond can be achieved between the compression ring and the over-mold element. Therefore, a tight seal can be achieved between the enclosure and the over-mold element although no direct fusion bond between the enclosure and the over-mold element may be possible. Consequently, embodiments of the invention offers a high degree of flexibility with respect to the materials being suitable for the enclosure and/or for the over-mold element. Particularly, embodiments of the invention provide a connector having an effective electromagnetic shielding of the connector by comprising an enclosure made of a metal and/or other highly conductive material in combination with an over-mold element ensuring good ingress protection against the intrusion of foreign objects, dust and/or moisture. Optionally, the enclosure is adapted to electrically and/or magnetically shield at least one electrical conductor received by the enclosure.

Moreover, embodiments of the invention allow reducing the effort and/or costs for producing a connector, in particular a connector having a high level ingress protection and/or offering electromagnetic shielding of the at least one electrical conductor arranged in the enclosure. In particular, according to embodiments of the invention only one molding step, in which the over-mold element is molded onto the enclosure and the compression ring, may be sufficient for achieving the desired properties regarding ingress protection and mechanical stability. Therefore, other steps, which are typically required in conventional production methods for manufacturing connectors having a high level of ingress protection, such as two-step molding and/or compression fitting between components of the connector, may be obsolete when using a method according to an embodiment of the invention. Consequently, embodiments of the invention allow reducing the required steps for producing a connector with high ingress protection and, hence, reduces the manufacturing costs and effort. Furthermore, embodiments of the invention may be beneficial with respect to environmental protection, since for example adhesives, conventionally used in two-step molding processes, may be obsolete.

In particular, production methods according to embodiments of the invention provide the advantage that no expensive, customized components are necessarily required, but regular, standardized components may be used. In addition, methods according to embodiments of the invention do not require a careful orientation of the single components relative to each other. Also, methods according to embodiments of the invention may be carried out using only one single tool and/or molding equipment, due to the method being based on one-step molding instead of several molding steps. Moreover, methods according to embodiments of the invention may be carried out in a larger parameter range with respect to the molding parameter resulting in less strict requirements regarding these parameters and/or a higher pass rate, i.e. a lower failure rate.

Furthermore, embodiments of the invention allow realizing connectors having an improved ingress protection as compared to conventional connectors. Due to the tight seal between the enclosure and the over-mold element being achievable by using an embodiment of the invention, ingress protection higher than specified by the International Protection Code IP67 according to DIN EN 60529 may be achieved, such as IP68 and/or IP69 due to high ingress protection against the intrusion of foreign objects, against damages due to touching the connector and/or against the intrusion of liquid and/or humidity. Optionally, the over-mold element and/or the sealing ring and/or the compression ring may be adapted and/or made of a suitable material to ensure a high resistance to chemicals, such as solvents and/or acidic and/or basic chemicals, allowing a use of the connector in respective chemical environments by preventing or reducing an ingress of chemicals in the connector.

Optionally, according to an embodiment, the conductor forms part of a cable extending out of the enclosure, and wherein the over-mold element is further arranged to surround the and wherein the over-mold element and the cable form a fusion and/or adhesion bond seal between themselves. This provides the advantage that the connector is sealed and ingress protected also at the interface with the cable. Optionally, the material(s) of the over-mold element and/or the compression ring and/or of an insulation material of the cable are adapted to allow a proper fusion and/or adhesion bond between them. According to another embodiment of the invention, the over-mold element and/or the compression ring and/or the insulation material of the cable may be made of the same material.

Optionally, according to an embodiment the sealing ring is at least partially made of a mechanically elastic material, preferably an elastomeric material. This ensures mechanically flexible properties and/or compressibility for achieving a tight seal between the enclosure and the compression ring. As an example, the sealing ring may comprise or may be made of at least one of the following materials: BUNA-N Rubber, Fluorosilicone Rubber, VITON® Fluoroelastomer Rubber Optionally, according to an embodiment, the compression ring has a mechanical rigidity allowing sufficient compression of the sealing ring for maintaining the mechanical seal between the enclosure and the sealing ring. In particular, the compression ring may be adapted to ensure sufficient compression of the sealing ring also without the over-mold element being arranged around the compression ring. This may facilitate the production of the connector, since the compression ring may be adapted to hold the sealing ring in place with respect to the enclosure and to establish a seal with respect to the enclosure also before and/or during the production step, in which the over-mold element is molded on top of the compression ring and the enclosure. Therefore, additional means for holding the sealing ring and/or the compression ring in place during production of the connector may be obsolete.

Optionally, according to an embodiment, the compression ring is made at least partly of a material, preferably a plastic material, allowing a fusion bond of the compression ring and the over-mold element when molding the over-mold element onto the compression ring. According to an embodiment, the materials of the compression ring and the over-mold element may be adapted to each other. For instance, the compression ring may be chosen to have a melting temperature corresponding to the melting temperature of the over-mold element, such as to partially melt when being in contact with the over-mold element during the molding step and forming a fusion bond with the over-mold element. The melting temperature of the compression ring may be equal to the melting temperature of the over-mold element's material. This may be achieved for example by providing the compression ring made of the same material as the over-mold element. Alternatively, the compression ring may be made of a material having a higher melting temperature than the over-mold element to ensure only partial melting of the compression ring during the molding of the over-mold element. For instance, the material of the compression ring may be chosen to be at least 1 K and/or not more than 50 K higher than the melting temperature of the over-mold element. An exemplary combination of materials could be TPU Elastollan® R3000 with a hardness of 73 Shore D and a material temperature at injection point of 225° C. for the compression ring and TPU Elastollan® C95 with a hardness of 95 Shore A and a material temperature at injection point of 215° C. for the over-mold element.

Optionally, according to embodiments of the invention, the over-mold element is made of a thermoplastic material. This ensures suitable properties for molding the over-mold element and for forming a fusion bond with the compression ring.

Optionally, according to an embodiment of the invention, a cross-sectional shape of the sealing ring is adapted to a cross-sectional shape of the enclosure. Alternatively or additionally, a cross-sectional shape of the compression ring is adapted to the cross sectional shape of the sealing ring and/or to the cross sectional shape of the enclosure. This allows proper mechanical fitting of the sealing ring and/or the compression ring to the enclosure for achieving a mechanical seal between the sealing ring and the enclosure and between the compression ring and the sealing ring. Optionally, the cross sectional shape of the enclosure and/or of the sealing ring and/or of the compression ring is a round shape and/or or an elliptic shape and/or of a polygonal shape. Optionally, the outer surface of the enclosure and the sealing ring and the compression ring have the same cross-sectional shape and are adapted to each other with regard to their spatial dimensions and/or size.

FIG. 1 depicts in a perspective view a connector 10 according to an embodiment of the invention. The connector 10 comprises a rigid enclosure 12 having a cylindrical shape and extending concentrically along a connector axis 1000. The enclosure receives one or more electrical conductors (see FIG. 2), which extend from the cable 14 into the enclosure 12. The cable 14 may have a metal layer surrounding the one or more electrical conductors for providing electromagnetic shielding of the electrical conductors. For achieving also an electromagnetic shielding of the electrical conductors in the area of the connector 10, in which the insulating shell and the metallic layer of the cable 14 are removed, the enclosure 12 is made of a metallic material.

A sealing ring 16 is arranged around the enclosure 12 surrounding the enclosure concentrically with respect to the connector axis 1000. The sealing ring 16 is made of a mechanically flexible material, such as a rubber or other flexible plastic material, to be attached tightly to the enclosure 12. In addition, a compression ring 18 is provided, which surrounds the sealing ring 16 and the enclosure 12 and presses the sealing ring 16 against the enclosure 12 to form a tight mechanical seal between the sealing ring 16, compression ring 18 and the enclosure 12. According to this embodiment, the compression ring 18 is in direct contact with the enclosure 12 and has a recess 18a, which is in direct contact with the sealing ring 16. The size and/or rigidity of the compression ring 18 is adapted such as to apply pressure in a radial direction towards the connector axis 1000 on the sealing ring 16 to form a tight mechanical seal between the enclosure 12, the sealing ring 16 and the compression ring 18. The rigidity and/or the size of the compression ring 18 and/or the height of the recess 18a may be adjusted to the thickness and/or the compressibility and/or the flexibility of the sealing ring 16 to achieve a tight mechanical seal between the sealing ring 16, the compression ring 18 and the enclosure 12. The sealing ring 16 and the compression ring 18 form together an ingress protection assembly 100 for protecting the connector from ingress of foreign objects, dust, dirt, humidity and/or water.

On top, an over-mold element 20 is arranged, which is molded onto the enclosure 12 such as to cover at least a part of the enclosure and at least a part of the compression ring 18. However, the over-mold 20 element cannot fusion bond with the enclosure 12, since the enclosure 12 is made of a metallic material and may not be molten during the production of the connector 10. Hence, the material of the over-mold element 20 is adjusted to the material of the compression ring 18 or vice versa, to allow a fusion bond of the compression ring with the over-mold element 20 for achieving a tight fusion bond seal between the compression ring 18 and the over-mold element 20. The over-mold element 20 is adapted and arranged to fix the compression ring with respect to the enclosure 12 and optionally to apply further pressure on the compression ring 18 and, hence, on the sealing ring 16 to enhance the tight mechanical seal. Consequently, the ingress protection assembly 100 protects the connector 10 at the connector's front side from ingress of foreign objects and/or fluids.

At the back end of the connector 10, the connector 10 is protected from ingress of foreign objects and/or fluids by the over-mold element 20 being attached to the cable, wherein the over-mold element 20 is attached to the cable by means of a fusion and/or adhesion bond with the insulating shell of the cable 14. Needless to say, that the ingress protection assembly 100 and/or the fusion and/or adhesion bond of the over-mold element 20 with the cable 14, preferably of both, are provided at the full circumference of the connector 10 and the cable 14, respectively, to provide full ingress protection of the connector 10 from all sides.

The depicted connector 10 further comprises an optional sleeve 22, which may be used for connecting the connector 10 to any envisaged connection means and/or for otherwise handling the connector 10.

Figure 2:
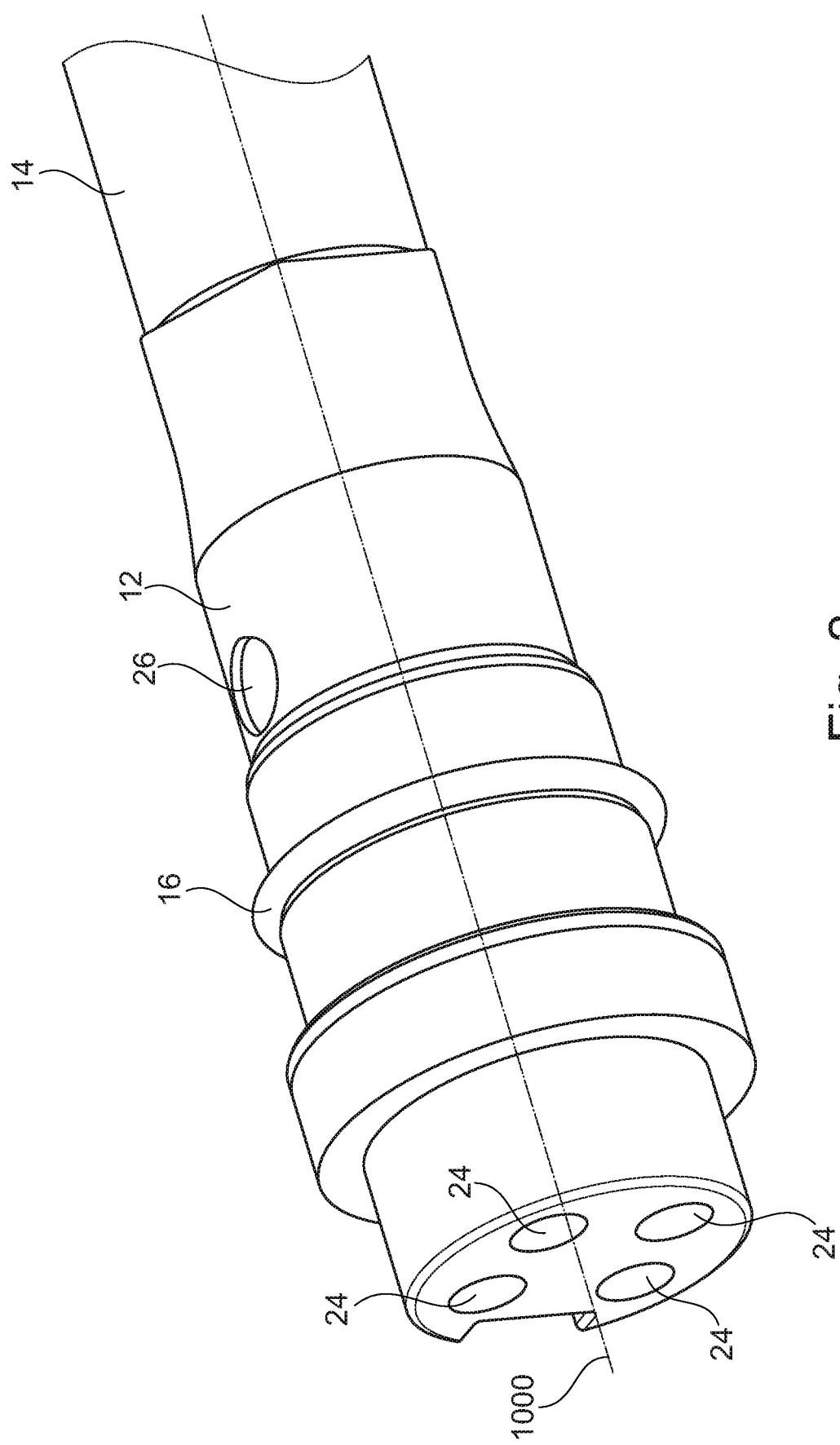
FIG. 2 depicts an ingress-protected connector according to an embodiment of the invention during a first stage of production.
Figure 3:
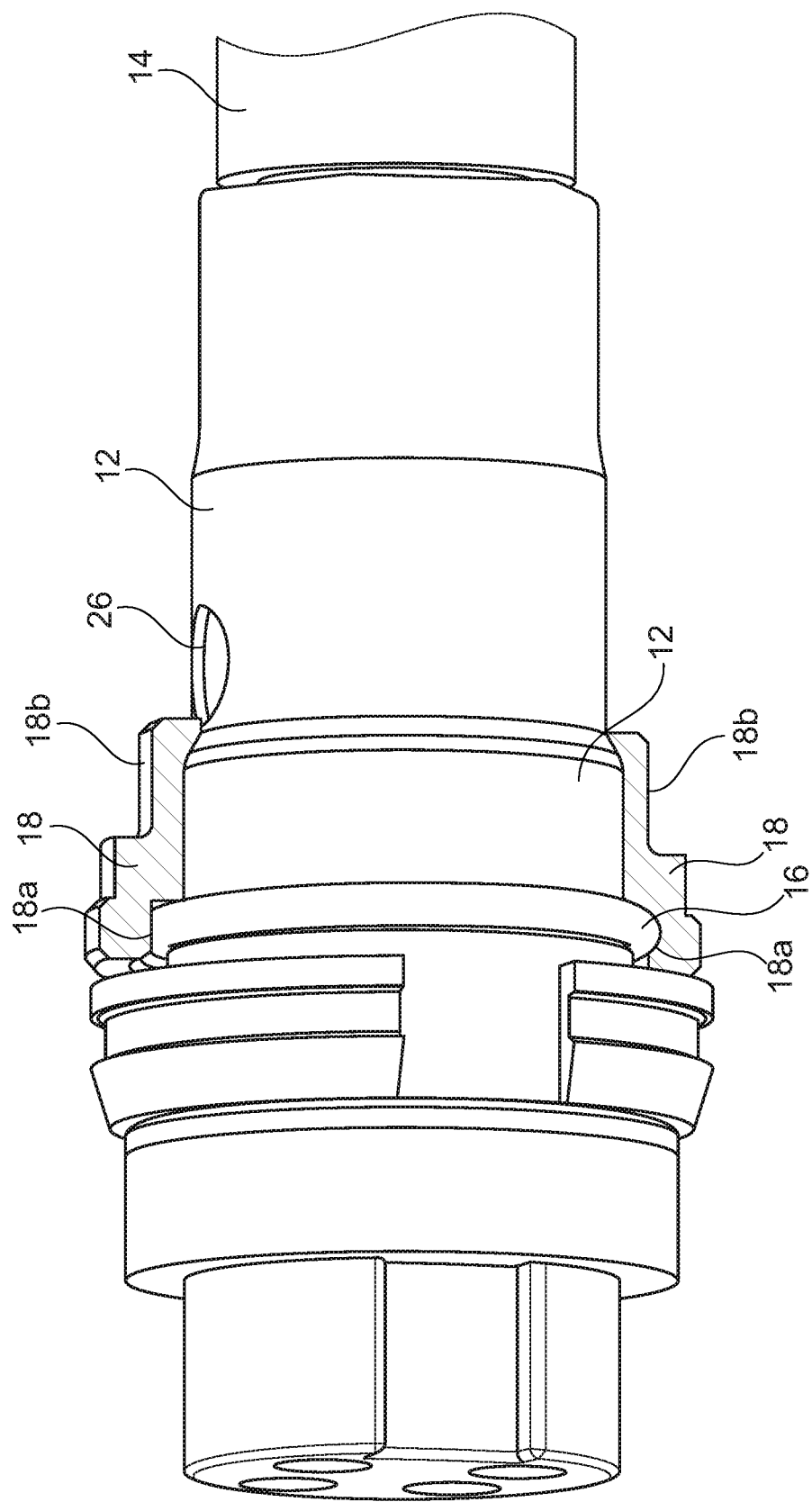
FIG. 3 depicts the ingress-protected connector of FIG. 2 during a second stage of production.
Figure 4:
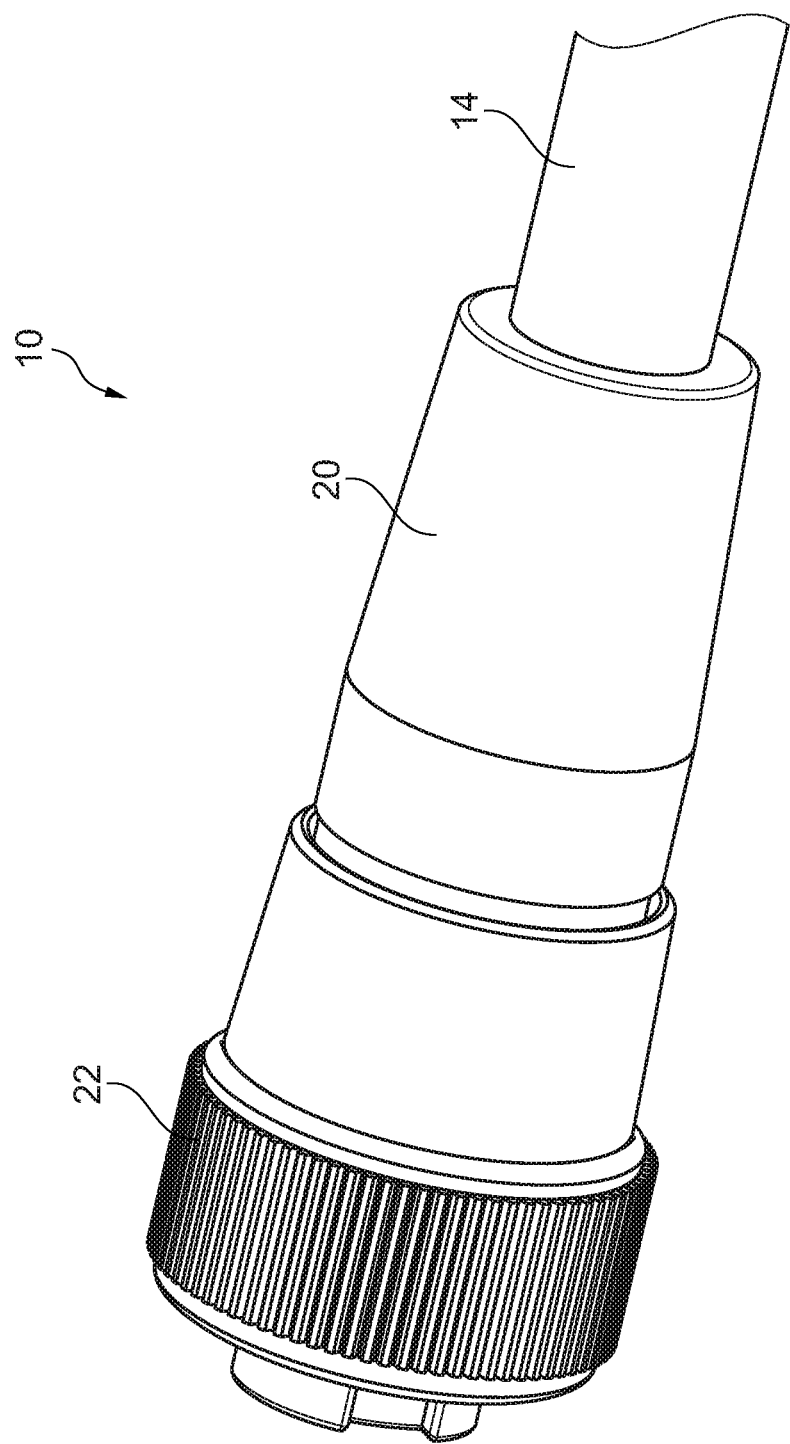
FIG. 4 depicts the ingress-protected connector of FIGS. 2 and 3 during a third stage of production.

With reference to FIGS. 2 to 4, steps for assembling or producing an ingress-protected connector 10 according to an embodiment of the invention is described. In a first step, shown in FIG. 2, the sealing ring 16 is arranged on the enclosure 12 to surround the enclosure 12 at this longitudinal position, i.e. along the direction defined by the connector axis 1000, at which the ingress protection seal shall be established. The sealing ring 16 is chosen, with respect to its size and/or material properties, so as to be capable of being arranged in a tight manner around the enclosure 12 at the desired position and optionally to stay in place without further fixation during the further production steps. As can be seen in FIG. 2, the enclosure 12 according to the shown embodiment receives four electrical conductors 24. These four electrical conductors 24 are metal wires, which extend through the enclosure 12 and through the cable 14. The enclosure is provided with a hole 26 allowing molding material to enter the interior of the enclosure 12 along the conductor axis 1000 when molding the over-molding element 20 to tightly seal also the interior of the enclosure and to ensure electrical insulation of the electrical conductors 24 with respect to each other within the enclosure 12.

In the next step, shown in FIG. 3, the compression ring 18 is arranged on top of the enclosure 12 and the sealing ring 16 to press the sealing ring 16 against the enclosure 12 and to mechanically fix the sealing ring 16 with respect to the enclosure 12. The mechanical stability of the sealing ring 16 and the compression ring 18 may be strong enough to sustain any further production step involved in assembling and producing the connector 10 without any unintended relocation of the sealing ring 16 and the compression ring 18 with respect to the enclosure 12.

The compression ring 18 is provided with a recess 18a allowing an arrangement of the compression ring 18 in direct and tight mechanical contact with the sealing ring 16 as well as with the enclosure 12. Further, the compression ring 18 is provided with a shoulder 18b offering a suitable surface to be contacted by the over-molding element 20 for establishing a fusion bond between the compression ring 18 and the over-mold element 20. This shoulder 18b further allows the over-mold element 20 to be flush with the compression ring 18 in radial direction, i.e. perpendicular to the connector axis 1000, which may be advantageous for a smooth and straight outer surface of the over-mold element 20 and/or the connector 10.

FIG. 4 shows the connector 10 after finishing its assembly and production, wherein the over-mold element 20 was arranged on top of the enclosure by molding. The over-mold element 20 is arranged such as to cover the enclosure at least partly and in particular to cover the interface between the enclosure 12 and the cable 14. Furthermore, the over-mold element 14 is attached to form a fusion and/or adhesion bond with the outer layer of the cable 14 to exhibit a tight seal for ingress protection at the end of the connector 10. At the front end of the over-mold element 20 the over-mold element 20 covers at least partly the compression ring 18 to stabilize the compression ring 18 and the sealing ring 16 and forming a fusion bond at its interface with the compression ring 18 at the shoulder 18b of the compression ring.

In addition, the optional sleeve 22 is attached for comfortably handling the connector 10, which may be provided with an internal thread and configured to allow fastening the connector to designated connection means.

Figure 5:
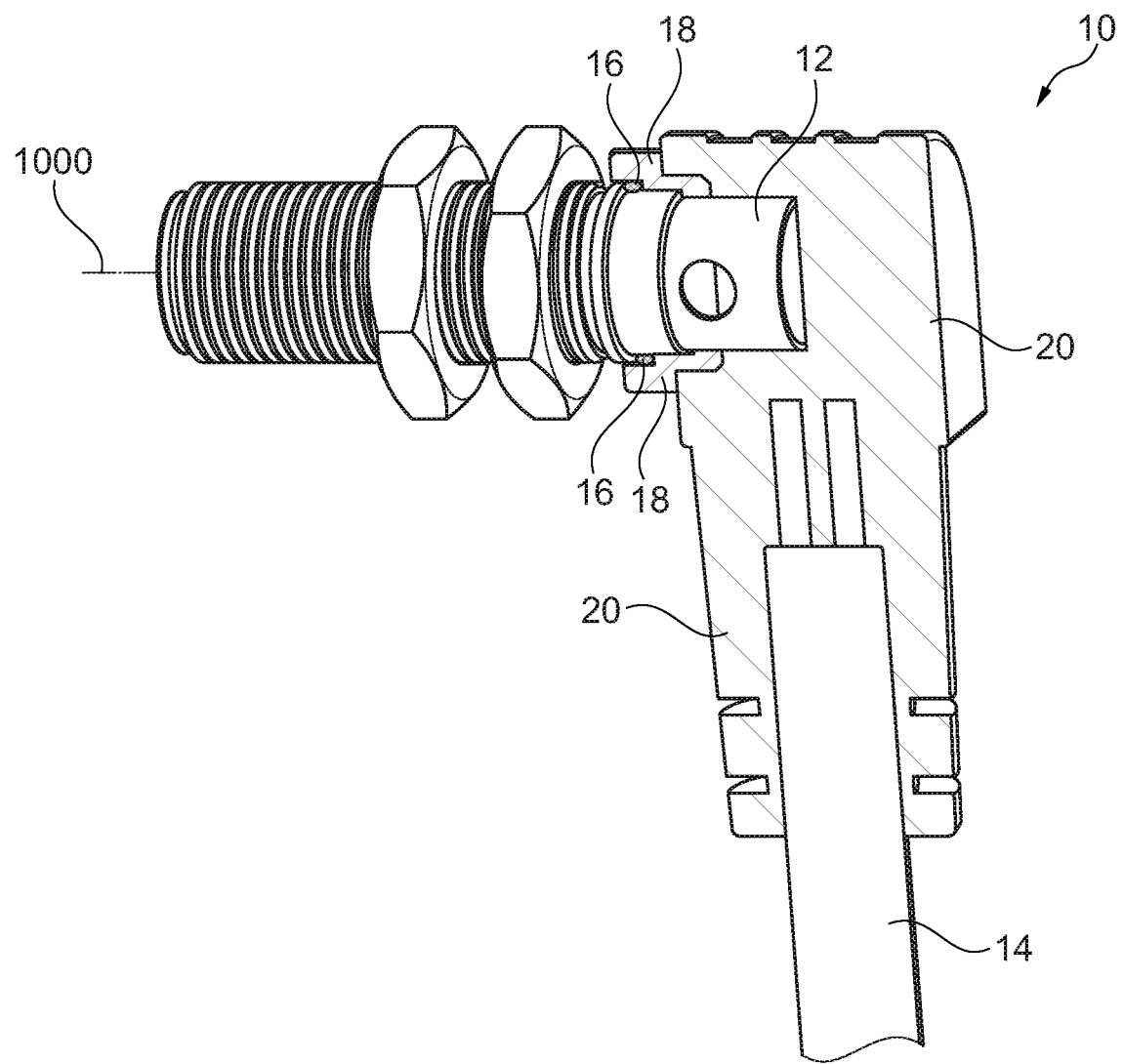
FIG. 5 depicts a connector according to an embodiment of the invention.

FIG. 5 depicts a connector 10 according to another embodiment, in which the connector is arranged in a 90° angle with respect to the cable 14. In other words, the connector axis 1000 extends perpendicular to a longitudinal axis of the cable 14. According to other embodiments, different angles than 90° may be possible. The angle between the connector 10 and the cable 14 is achieved by the over-mold element 20 fixing the enclosure 12, the sealing ring 16 and the compression ring 18 relative to the cable 14 at an angle of 90°. The electrical conductors 24 may be bent at the section extending between the cable 14 and the enclosure 12. A connector 10 according to this embodiment may be advantageous for being connected to connection means being difficult to access.

Figure 6:
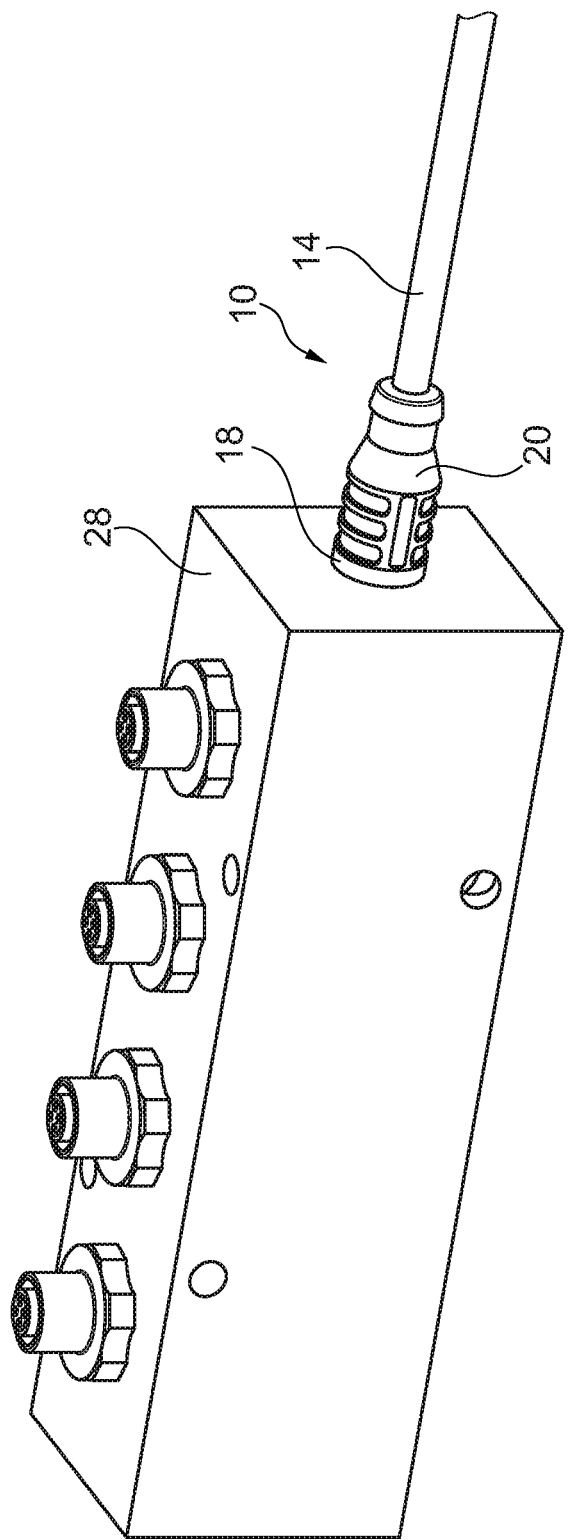
FIG. 6 depicts a connector according to an embodiment of the invention in a first perspective view.
Figure 7:
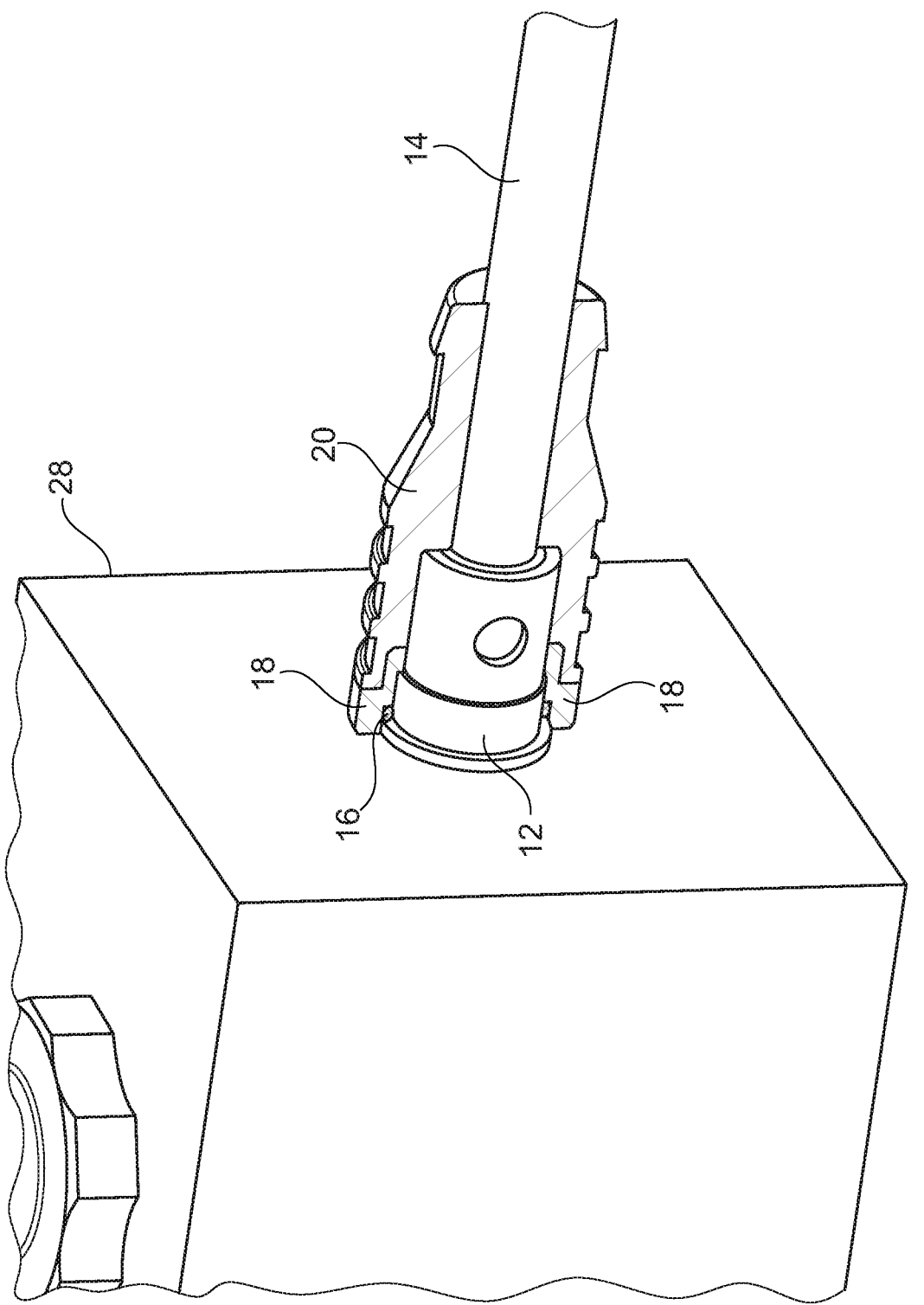
FIG. 7 depicts the connector of FIG. 6 in a second perspective view.

FIGS. 6 and 7 show in perspective views a connector 10 according to a further embodiment of the invention. The connector 10 according to this embodiment is fixedly attached to a device 28, such that the connector 10 and the cable 14 may not be removed from the device 28. As can be seen in particular in FIG. 7, the enclosure 12 may be a part of the device 28 and/or be attached to the device 28 in a fixed manner. The sealing ring 16 and the compression ring 18 are arranged in direct mechanical contact with an outer wall of the device 28 and are mechanically fixed by means of the compression forces applied by the compression ring 18 and the over-mold element 20 in radial direction. Therefore, a connector according to this embodiment may also be suitable for permanently connecting electrical connectors 24 with a device 28.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 connector
12 enclosure
14 cable
16 sealing ring
18 compression ring
18a recess (of the compression ring)
18b shoulder (of the compression ring)
20 over-mold element
22 sleeve
24 electrical conductor
26 hole (in the enclosure)
28 device
100 ingress protection assembly
1000 connector axis

What is claimed is:

1. A connector comprising:
an enclosure configured to receive at least one electrical conductor within the enclosure;
a sealing ring surrounding the enclosure in tight mechanical contact;
a compression ring surrounding the sealing ring in tight mechanical contact, the compression ring being adapted to press the sealing ring against the enclosure; and
an over-mold element arranged to surround at least a part of the compression ring and at least a part of the enclosure, the over-mold element configured to form a fusion bond with the compression ring;
wherein the sealing ring is configured to form a mechanical seal between the enclosure and the compression ring.

2. The connector according to claim 1, wherein the conductor forms part of a cable extending out of the enclosure,
wherein the over-mold element is further arranged to surround the cable, and
wherein the over-mold element and the cable are configured to form a fusion and/or adhesion bond seal between themselves.

3. The connector according to claim 1, wherein the sealing ring is at least partially made of a mechanically elastic material.

4. The connector according to claim 1, wherein the compression ring has a mechanical rigidity allowing sufficient compression of the sealing ring for maintaining the mechanical seal between the enclosure and the sealing ring.

5. The connector according to claim 1, wherein the compression ring is made at least partly of a material configured to allow a fusion bond of the compression ring and the over-mold element when molding the over-mold element onto the compression ring.

6. The connector according to claim 1, wherein the enclosure comprises a metallic material and/or a low-surface energy plastic material and/or a thermoset plastic material and/or a ceramic material or is made thereof.

7. The connector according to claim 1, wherein the enclosure is adapted to electrically and/or magnetically shield the at least one electrical conductor received by the enclosure.

8. The connector according to claim 1, wherein the over-molded element is made of a thermoplastic material.

9. The connector according to claim 1, wherein a cross-sectional shape of the sealing ring is adapted to a cross-sectional shape of the enclosure, and/or
wherein a cross-sectional shape of the compression ring is adapted to the cross sectional shape of the sealing ring and/or to the cross sectional shape of the enclosure.

10. The connector according to claim 1, wherein the cross sectional shape of the enclosure and/or of the sealing ring and/or of the compression ring is a round shape and/or or an elliptic shape and/or of a polygonal shape.

11. The connector according to claim 3, wherein the sealing ring is at least partially made of an elastomeric material.

12. The connector according to claim 5, wherein the material configured to allow a fusion bond of the compression ring and the over-mold element is a plastic material.

13. A method for producing a connector, the method comprising:
providing an enclosure receiving at least one electrical conductor within the enclosure;
arranging a sealing ring so as to surround the enclosure in tight mechanical contact;
arranging a compression ring so as to surround the sealing ring in tight mechanical contact and to press the sealing ring against the enclosure such that the sealing ring forms a mechanical seal between the enclosure and the compression ring; and
molding an over-mold element onto the enclosure so as to surround at least a part of the compression ring and at least a part of the enclosure and to form a fusion bond seal between the over-mold element and the compression ring.

* * * * *